Figure 1:
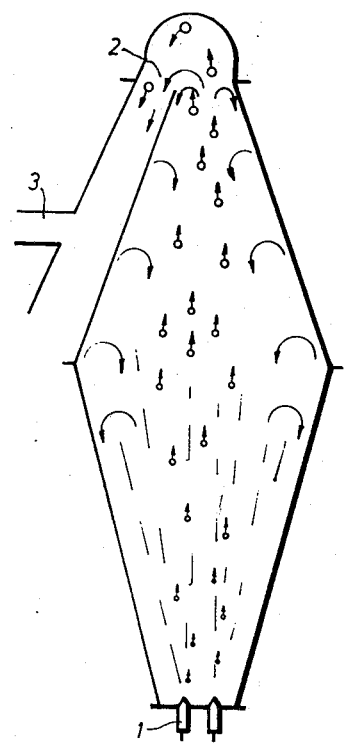

United States Patent

[11] 3,540,599

| [72] | Inventors | Hildegard Schnoring<br>Wuppertal-Elberfeld;<br>Herbert Nordt; Diez Heine, Leverkusen,<br>Germany |
|---|---|---|
| [21] | Appl. No. | 770,719 |
| [22] | Filed | Oct. 25, 1968<br>A division of Ser. No. 648,826,<br>June 23, 1967, abandoned |
| [45] | Patented | Nov. 17, 1970 |
| [73] | Assignee | Farbenfabriken Bayer Aktiengesellschaft<br>Leverkusen, Germany<br>a corporation of Germany |
| [32] | Priority | Aug. 24, 1966 |
| [33] | | Germany |
| [31] | | No. F50020 |

[54] APPARATUS FOR PROCESSING POLYMER SOLUTIONS
3 Claims, 2 Drawing Figs.

[52] U.S. Cl. ................................................. 210/539,
210/540
[51] Int. Cl. ............................................... B01d 41/10
[50] Field of Search ............................................ 210/188,
511, 537, 540, 539; 159/17; 23/1; 260/96

[56] References Cited
UNITED STATES PATENTS

| 474,685 | 5/1892 | Pennell .......................... | 210/188 |
| 1,159,044 | 11/1915 | Kelly ............................. | 210/537X |
| 2,874,842 | 2/1959 | Kropta .......................... | 210/540X |
| 3,374,207 | 3/1968 | Ayffel et al. ................... | 260/96X |

*Primary Examiner*—John W. Adee
*Attorney*—Connolly and Hutz

ABSTRACT: Apparatus for separating a polymer from solution in a water-immiscible organic solvent by the use of a vertically arranged separation zone of nonuniform cross section.

Patented Nov. 17, 1970

3,540,599

INVENTOR.S:
HILDEGARD SCHNÖRING, HERBERT NORDT, DIEZ HEINE.
BY
Connolly and Hutz
their attorneys

APPARATUS FOR PROCESSING POLYMER SOLUTIONS

This application is a division of U.S. Pat. application Ser. No. 648,326 filed June 23, 1967, and now abandoned.

It is known to process solutions of polymers, especially solutions of elastomers in organic solvents, by dispersing the solutions in a hot liquid phase which is immiscible with the organic solvents and evaporating the organic solvent. The solid polymer particles thereby formed from the dispersed droplets of solution can then be separated from the immiscible liquid phase by conventional methods, for example, by filtration.

It is further known to isolate polymers from their solutions in organic solvents by introducing such solutions into an aqueous medium the temperature of which is kept above the boiling point of the organic solvent or of its azeotrope with water, so that the solvent can be distilled off and the polymer remaining in the aqueous phase can be separated out mechanically. Conventionally this working-up operation is performed in stirrer-type vessels wherein the polymer crumbs tend to stick to the stirrer device. By a suitable mechanical stirring operation, an eddylike motion of water may be produced which removes from the precipitation zone the solid crumbs of product at the moment of their solidification thus preventing their sticking together (German Pat. No. 691,944), as long as the concentration of the polymer in the liquid phase is low. In connection with the isolation of elastomers of high inherent tackiness, such as, for example, 1,4-cis-polyisoprene, this process is a complete failure, because the crumbs which already have a low solvent content do stick to one another.

It is also known to carry out this type of working up operation in tubular reactors, which have the advantage by comparison with the stirrer-type vessel of not being equipped with internal fittings. However, this advantage is counterbalanced by a very low capacity and by a large overall height. The result of the unidirectional flow of product, water and solvent vapour (German Pat. No. 1,160,620) is a very high flow velocity and thus a very short residence time.

One object of this invention is an apparatus for the continuous recovery of polymers from their organic solvents by introduction of the organic solution, together with an immiscible liquid phase and optionally together with steam, into another liquid phase, the temperature of which is from about 1°C. to 30°C. above the boiling point of the organic solvent or of the azeotrope formed, and is characterised in that nonstationary flow eddies of the liquid phase are produced in a vertically disposed reactor of nonconstant cross section by generating vapors in the reactor by means of solvent vaporisation in an amount which is ten times the reactor volume.

It was found that a vessel or a reactor of specific shape is advantageous for carrying out the process. This reactor combines the advantages of a stirrer-type vessel with the advantages of a tubular reactor. The shape of this reactor can be described as two pyramidal or conical sections connected at the base surface, which sections have an inlet for the polymer solution and for the immiscible liquid phase and also for steam at the bottom end, and an overflow for the mixture of polymer particles and immiscible liquid phase and also a vapour outlet at the upper end.

The slope of the lower part of the reactor walls relatively to the vertical is to be between 4° and 30°. For the upper part of the reactor, the most favourable wall slope angle is between 10° and 45° relatively to the vertical.

It is also possible with advantage to interpose a length of constant cross section between the two conical or pyramidal parts of the reactor. By this means, the volume of the reactor is enlarged and its eddy zone is increased by this length of constant cross section. The advantageous properties are thereby fully maintained.

Figure 2:
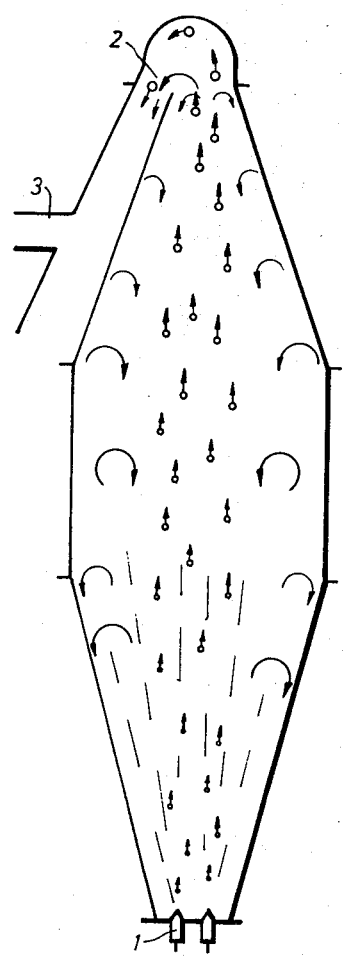

The essentials of the invention are explained diagrammatically by reference to constructional examples in FIGS. 1 and 2. FIG. 1 shows a reactor in longitudinal section. In the FIGS. 1 indicates an inlet for the polymer solution, the immiscible liquid phase and steam, 2 an overflow for the mixture of polymer particles and immiscible liquid phase and 3 a vapour outlet. FIG. 2 shows the same reactor with a straight intermediate section.

EXAMPLE 1

0.3 ton per hour of a 13 percent 1,4-cis-polyisoprene solution in hexane and 15 cubic metres per hour of water at 78°C., and also 400 to 500 kg. per hour of steam (4.5 atmospheres; 138°C.) are introduced into a reactor according to the FIGS., having a volume of 2 cubic metres, which is filled with water at 78°C. Fifteen cubic metres per hour of water and 31 kg. per hour of solid polyisoprene with a residual solvent content of 1 percent to 2 percent are discharged over the liquid weir. The average residence time of the product is 5 minutes.

EXAMPLE 2

1.33 tons per hour of a solution of chlorinated rubber in carbon tetrachloride (13 percent) and 30 cubic metres per hour of water at 80°C., and also 700 to 800 kg. per hour of steam (4.5 atmospheres; 138°C.) are introduced into a reactor according to the FIGS. with a volume of 2 cubic metres, the reactor being filled with water at 80°C. A vapour containing 1.15 tons per hour of carbon tetrachloride and also steam is drawn off through the top or head. This corresponds to 166 cubic metres per hour of carbon tetrachloride gas. Thirty cubic metres per hour of water and 182 kg. per hour of solid chlorinated rubber with a residual solvent content of 4 percent to 5 percent are drawn off over the liquid weir. The average residence time of the product is 3 minutes.

The process according to the invention, using a reactor of nonconstant cross section, is hereinafter described:

At the inlet, the bottom of the reactor, the cross-sectional area is relatively small. At this point, determined by the heat content of the reactor filling and optionally controlled by additional local heat supply, for example, by introduction of steam, a very intensive vaporisation of the solvent commences, and this is continued in the succeeding parts of the reactor. Such a quantity of polymer solution is supplied that there is formed an amount of solvent vapour of at least 10 times and advantageously up to 50 times the volume of the reactor. The individual bubbles of the vapour consequently very quickly assume a volume greater than 10 cc. From this size of bubble, their speed of ascent is constant. These bubbles, the total volume of which constantly increases, cause an upwardly directed flow of the liquid which surrounds them and in which the polymer product is dispersed.

The continuous widening of the reactor at an angle from 4° to 30° relatively to its vertical axis, has decisive advantages: With a high throughput of product and consequently a high gas loading of the reactor, a separation between vapour bubbles on the one hand and water/product on the other hand is effected, and thus the unidirectional flow between water/product and vapour is prevented. While the vapour bubbles are ascending vertically upwards, the liquid flow fills the entire reactor. The mean, upwardly directed flow velocity of the liquid is kept practically constant by the enlargement of the cross section. This is also the case if, due to an opening angle greater than 4°, the liquid is compelled to form an eddy. If the opening angle is chosen to be larger than 30°, areas of dead water are formed in which there can be depositions of the polymer product and which substantially reduce the yield per unit volume and time of the reactor. The intentional production of eddies results in an intensive mixing of the liquid-solid mixture and thus an increased heat exchange between the product and the hot, liquid phase. Because of the continuous increase in the cross section of the reactor, the product dispersed in the water has a substantially longer residence time than is expected by a calculation, based on the quantity of gas sent through the reactor. With an opening angle of the reactor between 4° and 30°, the residence time is generally about twice to 10 times the residence time in a comparable tubular reactor of the same volume.

The capacity of the reactor can thus be substantially increased by comparison with a reactor of constant cross section and equal volume. A lower content of residual solvent is produced by the intensive heat exchange. The use of the reactor with a high gas charging is consequently particularly advantageous, because an intensive stirring effect is achieved by the formation of eddies without internal fittings in the reactor. The polymer has a marked tendency to stick to those fittings which causes interruptions in the reactor operation. Therefore it is advantageous to be able to avoid any internal fittings. On the other hand, it is not possible in any case to dispense with the thorough mixing of the liquid phase with the polymer, since, as a consequence of the differences in density, such a rapid phase separation occurs without mixing that the polymer or elastomer is not completely freed from solvent.

The upper part of the reactor likewise has the form of a conical or pyramidal section, the cross section being reduced in an upward direction. The walls of the upper part of the reactor advantageously have an inclination angle between 10° and 45° in relation to the vertical axis. An angle greater than 45° does not provide any further lengthening of the residence time and facilitates in the agglutination of the product. Due to this inclination, firstly, the eddy formation in the upper part of the reactor is continued and, secondly, the flow velocity of the liquid in the reactor increases strongly in an upward direction. The cross section is advantageously reduced to such an extent that the flow velocity of the liquids at the top of the reactor is the same as, or greater than, the flow velocity of the ascending gas bubbles. The flow velocity of the gas bubbles is constant and is of the order of magnitude of 0.2 m./sec. Consequently, the flow velocity of the liquid at the top of the reactor has to be above 0.1 m./sec. This velocity renders possible a uniform discharge of the mixture of liquid phase (*i.e.* water and the optionally formed azeotrope with the organic solvent, solid substance and steam condensate) over a sharp edge (liquid weir).

A clogging of the reactor at the top end is thereby prevented and an accumulation of the product at the outlet from the reactor is made impossible.

The liquid phase used according to the invention can in principle be any liquid which is immiscible with the organic solvent of the polymer solution. In general, water is used. The organic solvent of the polymer solution is preferably an aliphatic or aromatic hydrocarbon or halogenated hydrocarbon, such as hexane, benzene or toluene. As polymers, polybutadiene, polyisoprene, chlorinated natural rubber, chlorinated polybutadienes or oil blends of these polymers are preferably used. In principle, however, any polymer which occurs in solution or emulsion can be worked up in accordance with the present invention.

We claim:

1. Apparatus for continuously recovering a polymer from solution in a water-immiscible organic solvent, said apparatus comprising an upwardly extending separation zone having a lower peripheral portion which extends upwardly and outwardly at an angle of 4° to 30° to the vertical and an upper peripheral portion extending upwardly and inwardly at an angle of from 10° to 45° to the vertical, means for introducing organic polymer solution and water into the bottom of said separation zone and means for removing separated product from the top of said zone, said latter means including a liquid weir together with associated means for separating water-immiscible organic solvent vapor and water.

2. The apparatus of claim 1 wherein said upper and lower peripheral portions are joined together at their respective lower and upper extremities.

3. The apparatus of claim 1 wherein said upper and lower peripheral portions are joined together by an intermediate peripheral portion of constant horizontal cross-sectional area.